(12) United States Patent
Carbonini et al.

(10) Patent No.: US 12,721,358 B2
(45) Date of Patent: Sep. 1, 2026

(54) SYSTEM AND METHOD FOR THE PREPARATION OF COFFEE TABLETS AND THE LIKE

(71) Applicant: Luigi Lavazza S.p.A., Turin (IT)

(72) Inventors: Carlo Carbonini, Turin (IT); Francesca Dangelico, Turin (IT); Massimo Di Marco, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 644 days.

(21) Appl. No.: 18/025,605

(22) PCT Filed: Sep. 9, 2021

(86) PCT No.: PCT/IB2021/058187

§ 371 (c)(1),
(2) Date: Mar. 9, 2023

(87) PCT Pub. No.: WO2022/053957

PCT Pub. Date: Mar. 17, 2022

(65) Prior Publication Data

US 2023/0345959 A1 Nov. 2, 2023

(30) Foreign Application Priority Data

Sep. 10, 2020 (IT) ........................ 102020000021496

(51) Int. Cl.
*A23F 5/12* (2006.01)
*A23L 5/30* (2016.01)
(Continued)

(52) U.S. Cl.
CPC ................ *A23F 5/125* (2013.01); *A23L 5/34* (2016.08); *A23P 10/28* (2016.08); *H05B 6/78* (2013.01)

(58) Field of Classification Search
CPC .................................. A23F 5/125; A23F 5/12
See application file for complete search history.

(56) References Cited

U.S. PATENT DOCUMENTS

| | | | | |
|---|---|---|---|---|
| 3,632,945 A * | 1/1972 | Johnson | H05B 6/782 | 219/696 |
| 5,436,432 A * | 7/1995 | Cyr | A23B 2/22 | 426/243 |

(Continued)

FOREIGN PATENT DOCUMENTS

| | | |
|---|---|---|
| EP | 2 665 365 | 5/2016 |
| EP | 3 185 690 | 12/2019 |

(Continued)

OTHER PUBLICATIONS

International Search Report and Written Opinion of the ISA for PCT/IB2021/058187 dated Dec. 22, 2021, 17 pages.

*Primary Examiner* — Virak Nguon
(74) *Attorney, Agent, or Firm* — Nixon & Vanderhye P.C.; Lars H. Genieser

(57) ABSTRACT

In a method for producing tablets for extraction of a liquid food product, a plurality of dosed amounts of a moistened powder ingredient are loaded into respective forming cavities of a multi-cavity forming device, the multi-cavity forming device is then introduced into a multimode cavity of a microwave oven, and thereafter the multi-cavity forming device is removed from the multimode cavity. The multimode cavity is prearranged in such a way that an irradiation of the microwaves thereinto causes heating of all dosed amounts of the ingredient in the respective forming cavities of the multi-cavity forming device, to form simultaneously a plurality of tablets each having a self-supporting structure.

28 Claims, 5 Drawing Sheets

(51) Int. Cl.
*A23P 10/28* (2016.01)
*H05B 6/78* (2006.01)

(56) References Cited

U.S. PATENT DOCUMENTS

| | | | | |
|---|---|---|---|---|
| 2011/0256277 | A1 | 10/2011 | Bows et al. | |
| 2013/0136843 | A1 | 5/2013 | Blanc | |
| 2014/0017368 | A1* | 1/2014 | Rastello-De Boisseson | A23C 9/18 426/285 |
| 2021/0259271 | A1* | 8/2021 | Bacchi | H05B 6/6447 |

FOREIGN PATENT DOCUMENTS

| | | | |
|---|---|---|---|
| WO | 2014/102316 | 7/2014 | |
| WO | 2018/118795 | 6/2018 | |
| WO | WO-2019106413 A1 * | 6/2019 | A23F 5/10 |
| WO | 2020/003099 | 1/2020 | |

* cited by examiner 1
2
3
4

1
2
3
4
5
6

11
11a
11a'
11b
13
13b 10
11
11a
11a'
$12_1$
$12_2$
12a
12b
13
13a
15a
15b

X
A
B
C
D
E
F
G
$20_1$
$20_2$
$20_3$
$20_4$
$20_5$
$20_6$
$20_7$
21
$12_1$
$12_2$
11
10
30
40
40a
41
50
51
60
70
71
80
81
82
83
85
MW
IN
OUT x
60'
$12_2$
61
$20_8$
11
$12_1$
H
30'
32
31
1
$20_9$
I
90
91
$20_{10}$
J
21
$20_{11}$
K
100
110
L

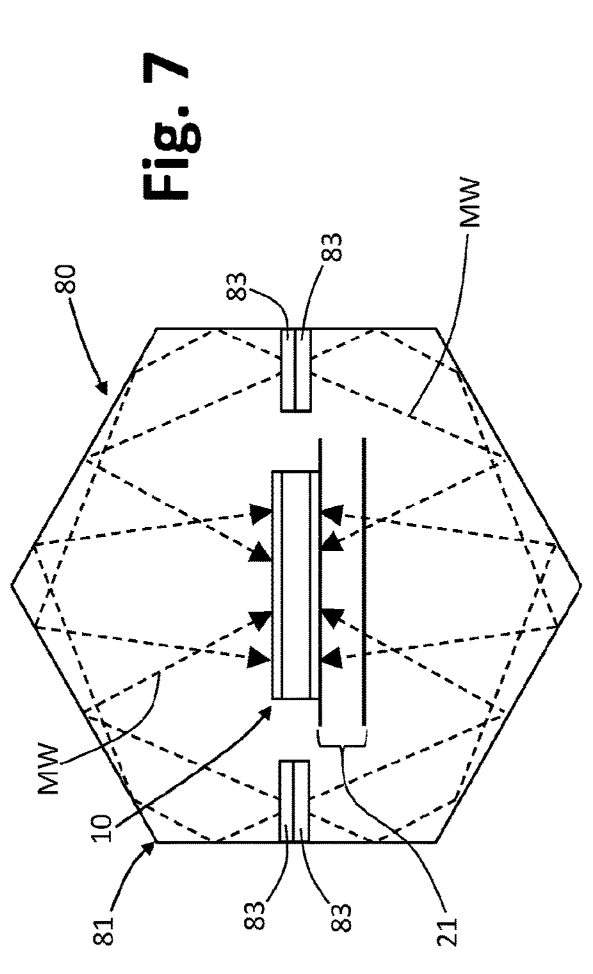
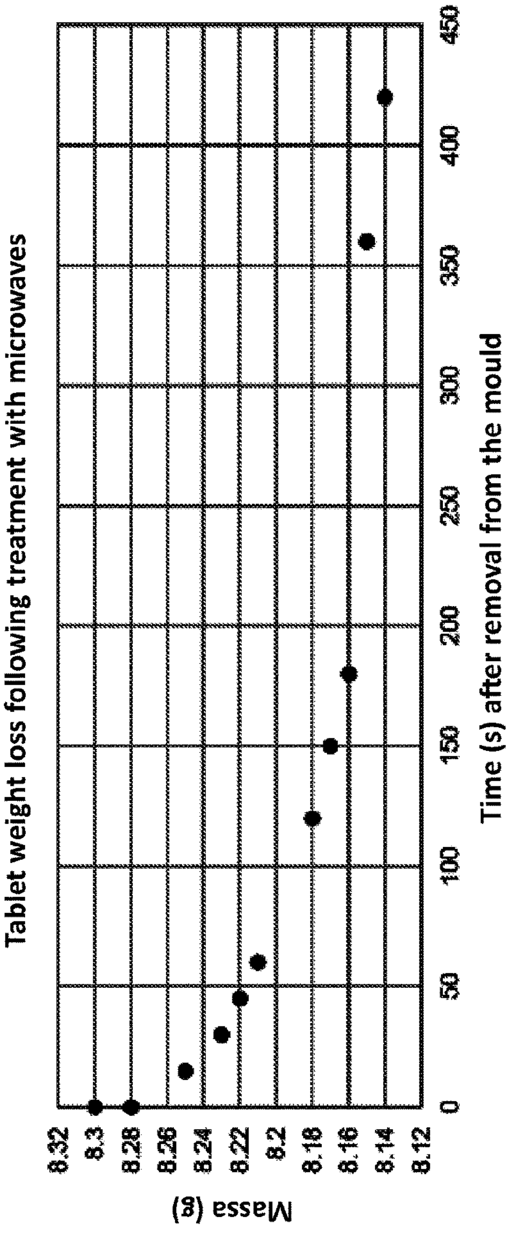
Fig. 8

SYSTEM AND METHOD FOR THE PREPARATION OF COFFEE TABLETS AND THE LIKE

CROSS-REFERENCE TO RELATED APPLICATIONS

This application is the U.S. national phase of International Application No. PCT/IB2021/058187 filed Sep. 9, 2021 which designated the U.S. and claims priority to IT Patent Application No. 102020000021469 filed Sep. 10, 2020, the entire contents of each of which are hereby incorporated by reference.

DESCRIPTION

Technical Field

The present invention generally relates to the preparation of liquid food products and was developed with particular attention being paid to the production of tablets (or pills) for the extraction of a liquid food product, starting from at least one ingredient in granular or powdered form, in particular coffee powder. The tablets obtainable by means of the systems and methods according to the invention are conceived for the preferred use on automatic and semiautomatic preparation machines, but design thereof for use on other preparation devices, such as coffee makers of the "moka" type or of the "Neapolitan" type, or press filter coffee makers or percolator devices, is not ruled out.

Background Art

The preparation of liquid food products using preparation machines or devices starting from pre-portioned doses of a precursor is widely used, particularly for the preparation of hot beverages, such as espresso coffee.

In some prior art solutions, the precursor dose of the beverage is packaged in a more or less rigid capsule, and the corresponding preparation machine is in any case designed to allow a preparation liquid (typically water) to pass through such capsule, to dispense an outflowing beverage.

In other preparation devices, the precursor dose is instead contained in a flexible water-permeable casing, typically a paper casing, usually referred to as "pod". In some cases, the pods are intended for use in automatic or semiautomatic preparation machines, while in other cases they are intended for use on coffee makers or percolators. Also in these solutions, in any case the pod is made to pass through by a flow of the preparation liquid.

The packaging of the single precursor dose entails various drawbacks, linked to the higher cost of the product, to the greater complexity of the production process, to the requirements of correct ecological disposal of the finished capsules or pods.

Such problems were addressed in the past by proposing the production of tablets of the precursor dose, having a self-supporting structure which does not necessarily require an outer casing. Such pills or tablets may be packaged in groups in one and the same container, for example a bag made of a material having good oxygen barrier properties, so as to avoid a rapid deterioration of the product (typically due to oxidation phenomena).

For example, WO 2014/064623 A2 and WO 2020/003099 A1 disclose systems and methods for the production of tablets for hot extraction of beverages, such as coffee or similar products, starting from a corresponding powder precursor, based on the use of microwaves.

The method described in WO2014/064623 A2 provides for the use of an arrangement which essentially comprises:

- a moistening system, for adding a given amount of water to the powder precursor;
- a homogenising device, for mixing the powder precursor and providing a substantially uniformly moistened mixture;
- a dosing unit, for isolating a predetermined dose of the moistened mixture;
- a forming device, having a hollow body suitable to receive the dose of moistened mixture;
- a compression device associated with the hollow body, for actively compressing the dose of moistened mixture and forming a tablet of desired shape;
- a microwave generator connected to a relative antenna, for directing a fixed-frequency microwave beam to the hollow body, while the mixture dose is compressed actively, and thus cause an overheating and/or a sintering of the precursor, thereby obtaining a tablet having a relatively compact and self-supporting structure, which does not require an outer coating.

Therefore, such prior art solution allows to produce tablets, which can be used in preparation machines and devices in general, which do not necessarily have to be packaged each in a corresponding casing, which is instead suitable to be packaged in groups, for example in a single bag.

However, productivity of the method and arrangement proposed in the cited prior art document is limited, in view of the fact that the tablets must be formed and treated individually, i.e., one at a time. Moreover, as indicated in the subsequent WO 2020/003099 A1, the step for moistening and homogenising the powder precursor as provided for in WO 2014/064623 A2 must be carried out manually, using particularly complex means, with a resulting increase in the time for producing each tablet.

In order to overcome these and other drawbacks, WO 2020/003099 A1 proposes an automated apparatus which substantially integrates all the operating units required for the production of tablets by means of microwaves, and therefore:

- a tank for supplying the precursor as grains or leaves,
- a device for grinding a precursor,
- a device for moistening the ground precursor,
- a device for mixing and homogenising the ground and moistened precursor,
- a dosing device, for obtaining single doses of the ground and moistened precursor,
- a forming device, with a pressure device associated thereto, for receiving a dose of the ground and moistened precursor and forming a tablet of predetermined volume therefrom,
- an irradiating device, for irradiating the dose of ground and moistened precursor with microwaves, while it is kept in a compressed condition in the forming device, in order to overheat and lead to a partial roasting and/or sintering of the particles of the dose.

The aforementioned operating units, and therefore the corresponding process parameters (grinding, moistening, homogenising, weighing, forming and irradiating), can be managed in a differentiated manner by a single control system, in order to allow the production of tablets even having different characteristics.

The aforementioned forming device disclosed by WO 2020/003099 A1 comprises a displacement support, substantially of the carousel type, which carries a plurality of cavities, each of which is intended to receive a respective dose of ground and moistened precursor. In this manner, by actuating the displacement device, each cavity can be displaced individually from a loading position, in which the cavity receives the dose of moistened precursor, to a treatment position, in which the cavity is inside a suitable irradiation chamber, at which the microwave generation device operates. In the treatment position, the cavity is axially aligned under the pressure device, which is actuated to keep the dose contained in the cavity in an active compression condition during the irradiation step. After heating, and therefore after the active pressure has been shut off, the cavity can be moved to a discharge position, in which the tablet is ejected from the corresponding cavity.

The apparatus disclosed by WO 2020/003099 A1 can be conceived so as to include a plurality of grinding, moistening, dosing, forming and irradiating devices, in order to enhance productivity. In this perspective, the proposed apparatus is advantageous with respect to the solution according to the preceding WO 2014/064623 A2, also in relation to process times and the number of tablets obtainable in a time unit.

However, also the solution according to WO 2020/003099 A1 implies that each tablet is formed and treated with microwaves individually, into an irradiation chamber designed to accommodate a single cavity from time to time and to press the content thereof, so strongly limiting the production capacity of the apparatus.

Aim and Summary

In the general terms thereof, the present invention aims at overcoming the aforementioned drawback, and in particular at providing a method and a system for the production of tablets of the indicated type which are more efficient from the production and energy point of view. An auxiliary aim of the invention is to allow to obtain high-quality tablets, while providing them with a comparatively lower amount of energy with respect to the cited prior art solutions.

According to the invention, at least one of the aforementioned aims is achieved by a system, a method and a tablet having the characteristics indicated in the attached claims.

The claims are an integral part of the technical teaching provided herein in relation to the invention.

BRIEF DESCRIPTION OF THE DRAWINGS

Further aims, characteristics and advantages of the invention will be more apparent from the description that follows, carried out with reference to the attached drawings, provided purely by way of non-limiting example, wherein:

FIG. 7 is a schematic cross-section aimed at exemplifying a possible mode for propagating microwaves in a multimode cavity of an oven, for irradiating a forming device which can be used in a method and a system according to possible embodiments; and FIG. 8 is a diagram aimed at illustrating the dynamics for reducing the weight of a tablet following treatment with microwaves.

DESCRIPTION OF PREFERRED EMBODIMENTS

Reference to an embodiment in this description indicates that a particular configuration, structure, or characteristic described regarding the embodiment is comprised in at least one embodiment. Therefore, phrases like "in an embodiment", "in various embodiments" and the like, possibly present in various parts of this description, do not necessarily refer to one and the same embodiment. Furthermore, particular shapes, structures or characteristics defined in this description may be combined in any suitable manner in one or more embodiments, even different from those shown. The numerical and spatial references (such as "upper", "lower", "top", "bottom", etcetera) as used herein are for convenience only and they do not therefore define the scope of protection or scope of the embodiments. In the figures, the same reference numbers are used to indicate similar or technically equivalent elements.

In the description below and in the attached claims, and unless otherwise specified, terms such as "ingredient" or "precursor" shall be understood as referring to a single substance or to a mixture of several substances indistinctively.

Figures 1, 2, 4:
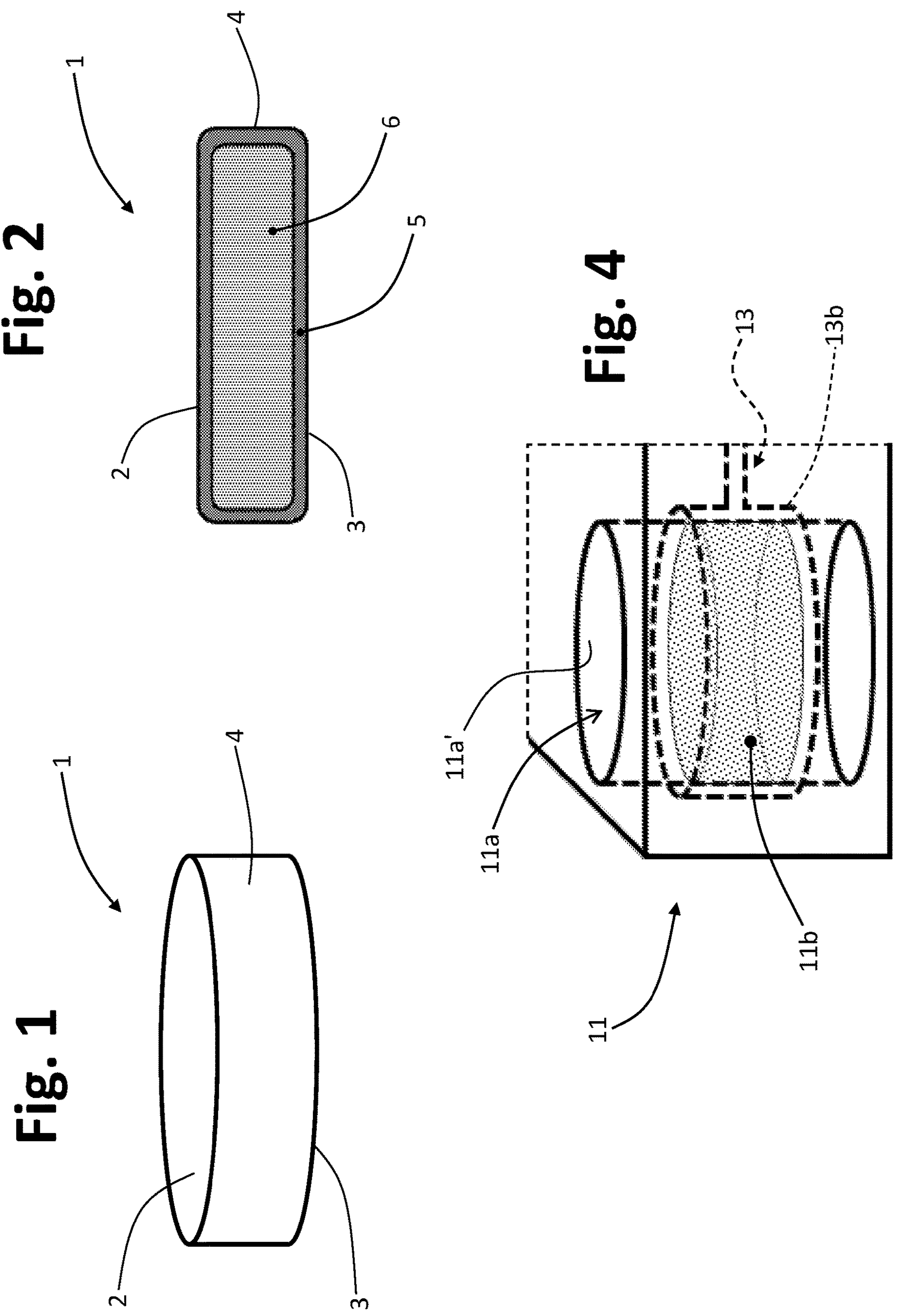
FIG. 1 is a schematic perspective view of a tablet for the extraction of a liquid food product, according to possible embodiments.
FIG. 2 is a schematic section of a tablet for the extraction of a liquid food product, according to possible embodiments.
FIG. 4 is a detail of a mould which can be used in a method and a system according to possible embodiments.

In FIG. 1, reference number 1 designates as a whole a tablet for the extraction of a liquid food product, according to possible embodiments, formed starting from a precursor or ingredient which is in powder or granular form, particularly a precursor or ingredient substantially insoluble in water: hereinafter, it should be assumed that the precursor is ground and roasted coffee powder, for example obtained from *Arabica* beans, or a mixture obtained from *Arabica* and *Robusta* beans. The invention is in any case also applicable to other types of precursors susceptible to be transformed into powder or grain form, according to per se known processes, and to produce a liquid food product when combined with water (for example barley, malt, tea, *ginseng*, infusions, preparations for broths or soups).

In general terms, the tablet 1 has a solid body having two end surfaces 2, 3 and a peripheral surface 4. In the example shown, the tablet 1 is essentially disc-shaped, and therefore it has a substantially cylindrical peripheral surface. Other shapes are of course possible.

The tablet may have a diameter approximately comprised between 20 and 60 mm (for example about 40 mm) and a thickness comprised between 5 and 50 mm (for example 12-13 mm for espresso coffee and 25-30 mm for "double"/"lungo" coffee or filter coffee). The weight thereof may be comprised between 3 and 30 g (for example 8-10 g for espresso coffee and 12-15 g for "double"/"lungo" coffee or filter coffee).

With reference also to FIG. 2, in various embodiments, the body of the tablet 1 has a self-supporting structure, distinguished by the presence of a crust or outer shell 5 and an inner core 6, both formed by the same precursor—coffee powder in this case—but having a different degree of compactness. In particular, the outer shell 5, which preferably defines both the end surfaces 2, 3 and the peripheral surface 4, has a compact and substantially rigid structure, acting as a "container" for the inner core 6, having a less compact structure. In particular, at the core 6, the precursor can also maintain a substantially loose powder or granular form. As will be clear hereinafter, such differentiated structure of the tablet 1 can be obtained by means of a particular treatment process which allows—among other things—to reduce alterations in the organoleptic properties of the precursor dose which forms the tablet 1.

In the production method according to the invention, each tablet 1 is formed starting from a respective dosed and moistened amount of the precursor, which is irradiated with microwaves while contained in a confined volume.

In accordance with the invention, a plurality of dosed amounts of the precursor are loaded into respective cavities of a multi-cavity forming device, and this forming device is introduced in multimode cavity of a microwave oven. The multimode cavity of the oven is prearranged in such a way that distribution of the microwaves within the cavity itself heats simultaneously all the dosed amounts of the ingredient inside the respective forming cavities of the forming device; thereafter, the multi-cavity forming device is removed from the multimode cavity of the microwave oven. This allows to form simultaneously and in a quick manner a plurality of tablets 1. As will become apparent hereinafter, the proposed method also makes it possible to obtain advantages in terms of energy savings.

In particularly advantageous embodiments, the multimode cavity of the microwave oven is substantially configured as a tunnel, and the multi-cavity forming device is displaced according to a direction of advancement between an entry and an exit of the multimode cavity. Such solution may allow to further boost productivity, allowing a substantially continuous processing, suitable to produce large amounts of product in a time unit.

In preferred embodiments of the invention, provided for before introduction of the forming device through the multimode cavity of the microwave oven, is a step for the selective moistening of each dosed amount of ingredient, i.e., only at a surface layer thereof. Such moistening step is in particular carried out after loading each dosed amount of the ingredient in the respective forming cavity of the forming device. This localised moistening of each dose of the precursor allows for example to obtain the structure described above with reference to FIG. 2, with ensuing advantages in terms of saving energy, reducing treatment times and abating dusting phenomena, as explained thereafter.

In preferred embodiments, the microwaves are irradiated in the multimode cavity of the oven starting from a plurality of microwave sources, or in any case the microwaves are introduced into the multimode cavity from a plurality of different areas. Such solution allows to improve the distribution of energy in the multimode cavity, to obtain as a consequence a uniform heating of the plurality of precursor doses contained in the forming cavities of the forming device.

In preferred embodiments, during irradiation in the multimode cavity of the oven, the dosed amounts of the precursor are contained in the respective forming cavities of the forming device in the absence of an active compression. As will be observed, such solution allows a significant simplification of the forming device, for the purpose of the treatment thereof in the multimode cavity of the oven. In any case it may be preferable to at least temporarily subject the dosed amounts of the ingredient contained in the forming cavities to an active compression, before introduction of the forming device into the oven. This active compression may be useful to determine an initial compaction of doses in the relative forming cavities, or to determine the initial size and density thereof.

In various embodiments, the method for producing tablets according to the invention is implemented through a system configured as a substantially continuous production line, comprising a succession of subsystems or operating stations, through which one or more parts of the forming device pass according to a direction of advancement.

In general terms, the aforementioned system comprises at least:

one forming subsystem, configured (i.e., comprising means) to confer a predefined shape to the tablets;

one loading subsystem, configured (i.e., comprising means) to supply the precursor, in a dosed amount, into a respective forming cavity of the forming subsystem;

one moistening subsystem, configured (i.e., comprising means) to moisten at least part of each precursor dose;

one heating subsystem, configured (i.e., comprising means) to irradiate with microwaves the ingredient while contained in the respective forming cavity of the forming subsystem;

one transport subsystem, configured (i.e., comprising means) to cause displacement of the forming subsystem at least through the heating subsystem.

The forming subsystem comprises the previously mentioned multi-cavity forming device, and the loading subsystem is designed to load a plurality of dosed amounts of the ingredient in respective forming cavities of the forming device. The heating subsystem comprises the previously mentioned microwave oven, with the corresponding multimode cavity into which the forming device is introduced and removed by means of the transport subsystem, in such a way that the microwaves heat all the dosed amounts of the ingredient in the respective forming cavities.

As will be observed, in preferred embodiments of the production system according to the invention, the transport subsystem is configured (i.e., comprises means) to cause displacement of at least one part of the forming device in a direction of advancement also between a succession of other operating units or stations selected from:

one or more first units or stations for handling parts of the forming device, upstream of the microwave oven;

a loading unit or station, for loading the plurality of dosed amounts of the ingredient, upstream of the microwave oven;

a pressing unit or station, for pressing the plurality of dosed amounts of the ingredient, upstream of the microwave oven;

a moistening unit or station, for partially moistening the plurality of dosed amounts of the ingredient, upstream of the microwave oven;

one or more second units or stations for handling parts of the forming device, downstream of the microwave oven;

a separation unit or station, for removing the tablets from the forming device or from a part thereof, downstream of the microwave oven;

a unit or station for desiccating and/or drying and/or cooling the tablets downstream of the microwave oven; and a unit or station for packaging the tablets.

Figure 3:
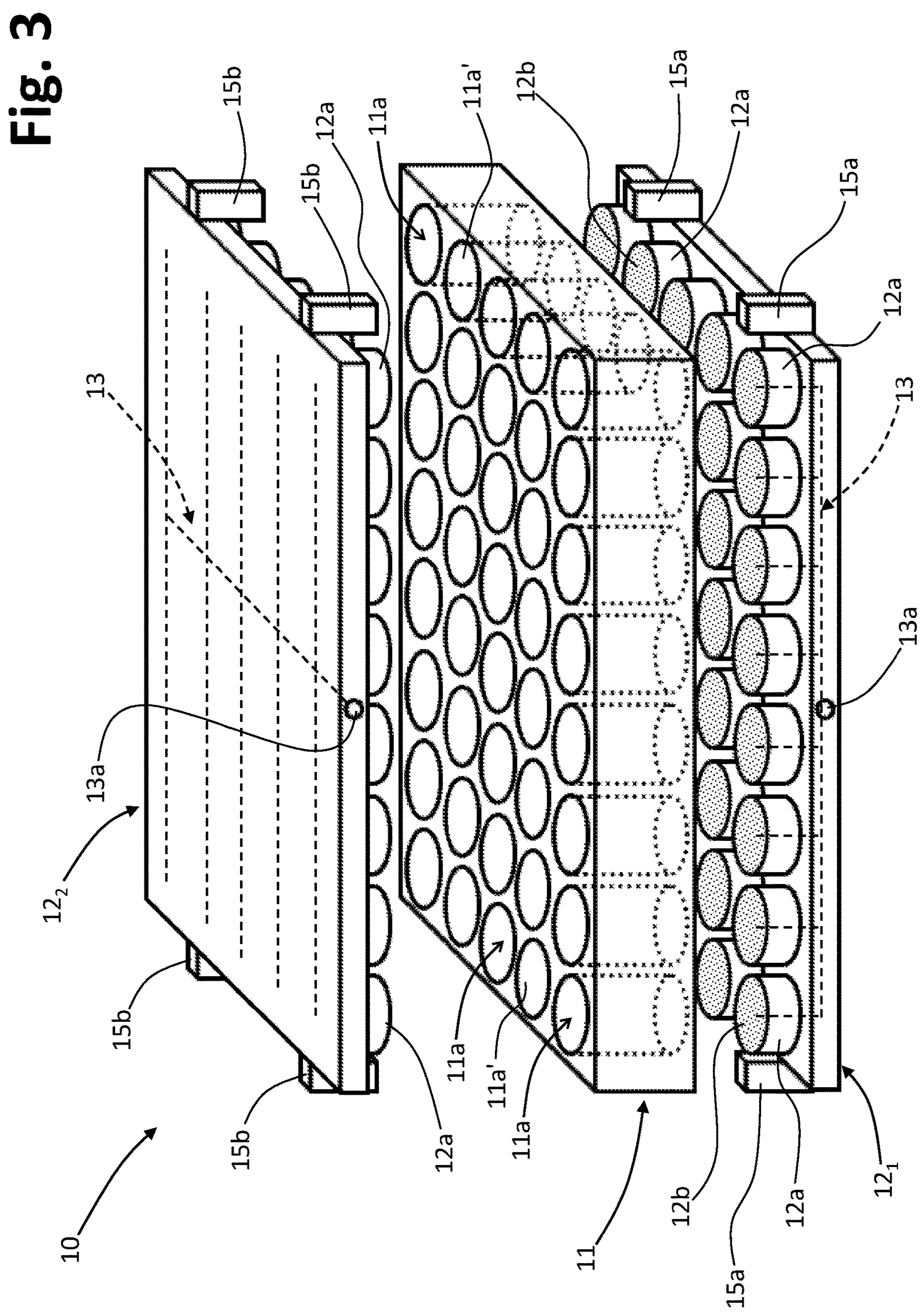
FIG. 3 is a partially exploded schematic perspective representation of a mould which can be used in a method and a system according to possible embodiments.

FIG. 3 schematically shows a possible multi-cavity forming device which can be used according to the invention, indicated in its entirety with 10, which substantially is a mould.

In various embodiments, the forming device 10 comprises a main part 11, in which a plurality of forming cavities 11*a* are partially defined, and at least one second part 12, which can be releasably coupled to the main part 11, to close the cavities 11*a* at at least one of the axial ends thereof. In the case exemplified between the two larger faces of the main part 11—here being substantially parallelepiped-shaped—there extend a plurality of through holes 11*a*' which form the peripheral surface of the cavities 11*a*, preferably having a substantially circular cross-section. The device 10 further comprises both a bottom part $\mathbf{12}_1$, and a head part $\mathbf{12}_2$, intended to be superimposed to the larger faces of the main part 11, in order to close the corresponding cavities 11*a* at the two opposite ends. In other embodiments not shown, the bodies 11 and $\mathbf{12}_1$ may be replaced by a single body, with holes 11*a*' which are therefore configured as blind holes having a smaller height with respect to the exemplified one. In the schematic example, the device 10 is configured to define forty forming cavities 11*a*, but obviously this number could be greater or smaller.

In various embodiments, such as the one exemplified in FIG. 3, the bottom part $\mathbf{12}_1$ and the head part $\mathbf{12}_2$ are substantially plate-shaped and each has a plurality of projections 12*a* intended to be at least partially inserted into the holes 11*a*', in a plug-like manner. To this end, the projections 12*a* preferably have a cross-sectional shape substantially corresponding to that of the holes 11*a*', slightly smaller in diameter. The coupling between the projections 12*a* and the holes 11*a*', or more generally between the parts $\mathbf{12}_1$ and $\mathbf{12}_2$, on the one hand, and the part 11, on the other hand, must not necessarily be of the sealing type: this in order to allow venting of possible steam from the cavities 11*a*, for the reasons explained below (and without prejudice to the fact that the parts 11, 12 could in any case provide for appropriate passages for the venting of steam from the cavities 11*a*).

Providing the projections 12*a*, although preferable, does not represent an essential characteristic, given that the face of one or both of the parts $\mathbf{12}_1$ and $\mathbf{12}_2$ intended to be coupled to the corresponding face of the part 11 could be flat, in which case the holes 11*a*' will have a height smaller than the one exemplified in FIG. 3.

As evincible from FIG. 3, the sum of the heights of the projections 12*a* is smaller than the height of the holes 11*a*': in this manner, in the assembled condition of the device 10, a volume suitable to contain a respective precursor dose is defined in the cavity 11*a*. Such containment volume is laterally delimited by an intermediate cylindrical fascia of the peripheral surface of the holes 11*a*', and it is delimited—at the lower part and at the upper part—by the end surfaces of the projections 12*a* of the parts $\mathbf{12}_1$ and $\mathbf{12}_2$, respectively.

In various preferred embodiments, the forming device, or one or more of the parts thereof, has at least one fluidic circuit, configured (i.e., comprising means) to supply a moistening fluid into each forming cavity. To this end, each forming cavity preferably has respective moistening passages, connected in fluid communication with the aforementioned hydraulic circuit, such passages being at at least one surface delimiting the respective cavity.

In the exemplified case, at the end surfaces of the projections 12*a* of the parts $\mathbf{12}_1$ e $\mathbf{12}_2$, intended for insertion into the holes 11*a*', there are defined passages 12*b*, suitable for the introduction of the moistening fluid into the cavities 11*a*. In this manner, the fluid can be introduced at the two axial ends of the respective cavity 11*a*.

The passages 12*b* are connected to respective ducts belonging to the aforementioned hydraulic circuit, represented only schematically and indicated with 13 as a whole, provided with a respective inlet 13*a*, herein defined at a peripheral side of the corresponding part $\mathbf{12}_1$ and/or $\mathbf{12}_2$. In the schematic example, although the various arrays of passages 12*b* are connected in parallel to respective branches of the hydraulic circuit 13, other circuit solutions are obviously possible so as to allow the fluid to be supplied, according to any per se known technique.

In various embodiments, additionally or alternatively, similar moistening passages are also provided on at least part of the peripheral surface of the cavities 11*a*. Referring for example to FIG. 4, an array of passages 11*b* is defined in the cylindrical surface of the holes 11*a*', at the corresponding annular fascia intended to laterally delimit the volume suitable to contain the precursor dose. To this end, the aforementioned fascia may be defined by a cylindrical wall provided with the passages 11*b*, which is surrounded by a respective chamber 13*b* supplied by the corresponding hydraulic circuit 13. Also in this case, other circuit solutions for supplying several passages defined on the peripheral wall of the cavities 11*a* with the moistening fluid are obviously possible.

Obviously, in possible variants, the fluidic system of the forming device can be designed or controlled to determine localised moistening of only one or both of the axial end regions of the dosed amount of the precursor, or only of the peripheral region thereof: in such cases the final tablet will therefore not have a full shell of the type indicated above, but one or more crusts with similar characteristics only at the previously selectively moistened area (for example a crust 5 only at the surface 2 and/or the surface 3, or a crust 5 only at the peripheral surface 4, and possible other combinations).

At least the parts of the device 10 defining the forming cavities 11*a* are made of a material transparent to the microwaves, preferably a polymer, for example a thermoplastic material.

For example, a material that can be used for this purpose is for example polyether ether ketone (PEEK), an organic thermoplastic polymer having excellent mechanical characteristics (strength, hardness, low density), excellent thermal characteristics (ability to withstand high temperatures and resistance to thermal fatigue), excellent chemical strength and high wear resistance characteristics, with low friction. This material, possibly filled (for example with glass fibre), is perfectly suitable to handle food products. In any case, the material used may also be provided with a coating (for example with PTFE) suitable to avoid the release of material.

The parts 11 and 12 of the forming device may be produced, for example, according to any known technology, for example additive technique or 3D printing, which allows to produce structures of the exemplified type in a relatively simple manner. Such technique is also advantageous for the purposes of defining the hydraulic circuits inside the parts 11, 12, said parts being suitable to be made of several pieces obtained by means of the additive technique and then assembled together in a sealed manner, if necessary, after positioning possible control members (such as for example valves or flow diverters) between such pieces.

The moistening passages 11*b* and/or 12*b* and the corresponding hydraulic circuits may possibly be in the form of micro-passages and micro-ducts, respectively. As mentioned, the hydraulic circuit of one or more parts 11, 12 could be provided with suitable electrically powered control devices, such as for example valves, possibly of the miniaturised type (for example which can be obtained using the MEMS-Micro Electro Mechanical Systems) technology.

Preferably, the parts 11, 12 of the device 10 are held in the assembled position thereof by means of suitable releasable coupling elements. In the case exemplified in FIG. 3, for example, the bottom part $\mathbf{12}_1$ and the head part $\mathbf{12}_2$ have lateral engagement members, indicated with 15*a* and 15*b*, intended to be releasably coupled to the main part 11. Obviously, additionally or alternatively, mutual coupling members may be provided for between the parts $\mathbf{12}_1$ and $\mathbf{12}_2$, i.e., intended to couple to each other, rather than on the part 11. The coupling elements used may be of any known design, for example designed for snap-coupling, but provided in any case with a release mechanism which can be actuated—for example—by pressing, in order to allow decoupling thereof, and therefore the subsequent separation between the parts 11 and 12.

Figure 5:
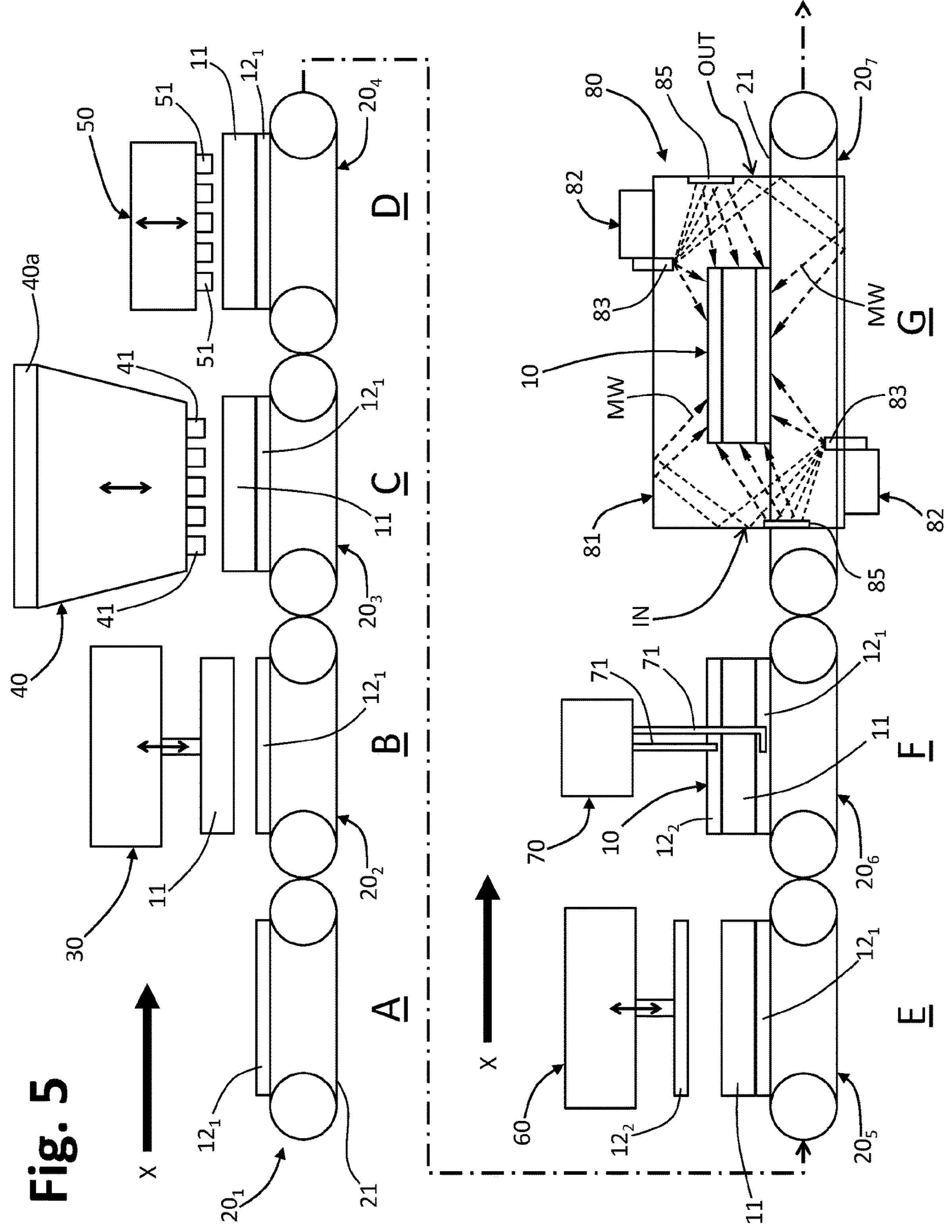
FIGS. 5 and 6 are schematic representations aimed at exemplifying a possible succession of steps (and of operating units) of a process (and of a system) for the production of tablets for the extraction of a liquid food product, according to possible embodiments.
Figure 6:
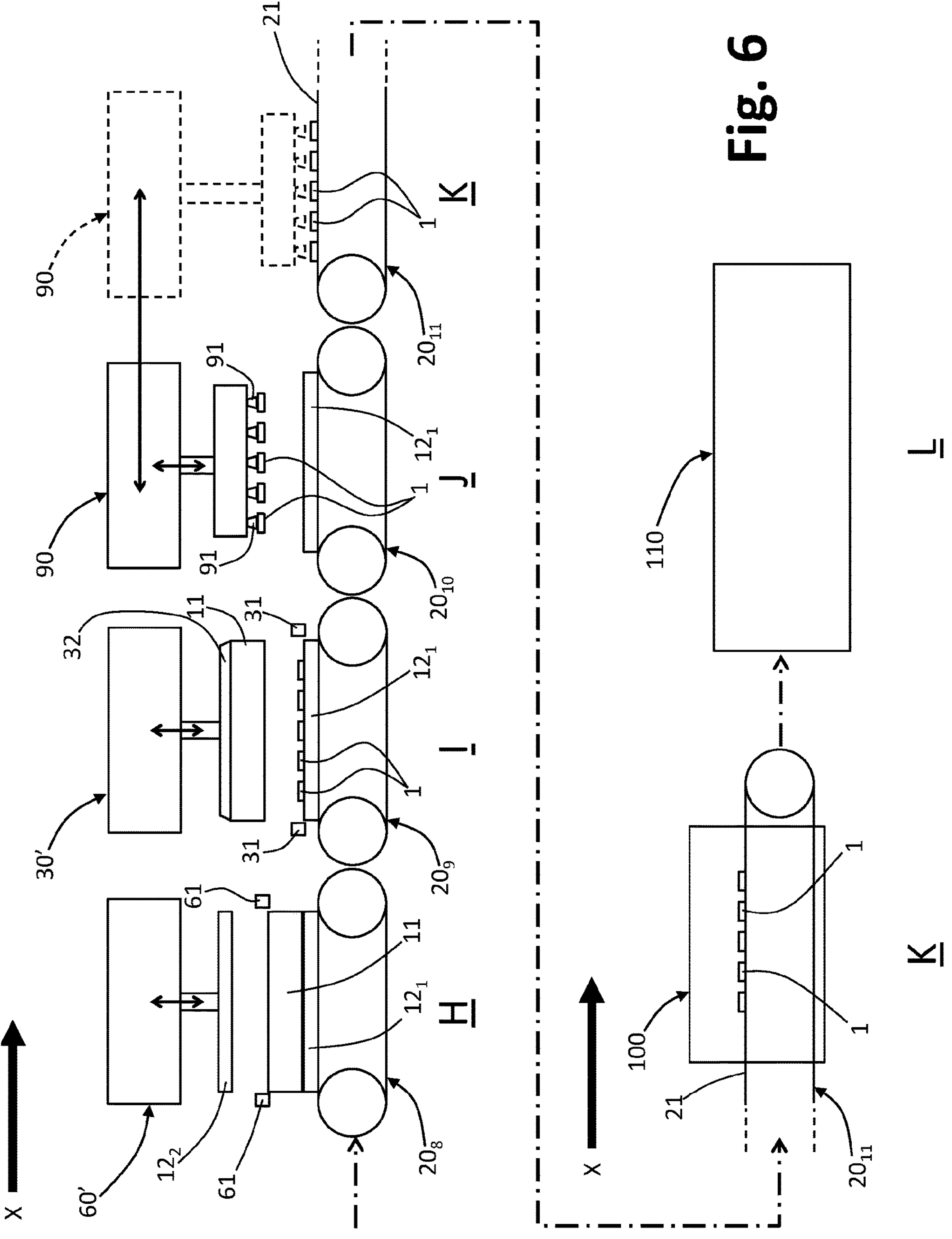

FIGS. 5 and 6 schematically illustrate a possible system for the production of tablets according to the invention, configured as a processing line comprising a plurality of subsystems or operating stations. In the description of such figure, reference will be made to various elements the device 10 not shown in these figures (such as cavities 11*a*, holes 11*a*', projections 12*a*, passages 11*b*-12*b*, members 15*a*-15*b*, circuits 13), and for which reference shall be made to FIG. 3.

In various preferred embodiments, the system includes a transport subsystem, configured (i.e., comprising means) to obtain displacement of the forming device 10, or of parts 11, $\mathbf{12}_1$, $\mathbf{12}_2$, thereof, according to a direction of advancement, indicated with X, between the various operating stations. Preferably, the transport system comprises a plurality of conveyor devices 20 arranged in succession. Hereinafter it will be described—for the sake of simplicity—the case in which a conveyor device 20 is provided at each operating station, but this shall not be deemed an essential characteristic given that one and the same conveyor 20 could serve at least two successive operating stations.

In preferred embodiments the conveyor devices 20 are belt conveyors. Preferably, the belt 21 is at least partly made of a material transparent to microwaves, for example a polymeric or synthetic material, possibly provided with a coating suitable to avoid the release of material. Materials that can be used are for example PEEK, or PP, or PTFE, or Kevlar, or glass fibre, with a possible coating made of PTFE or other, and, more generally, any material commonly used for the purpose in the food industry. In any case, metal belts, for example made of stainless steel, of the type currently used in the food industry cannot be ruled out from the scope of the invention (although the use thereof may complicate the design of the oven irradiation system to a certain extent).

With reference to FIG. 5, a starting operating station, in which the bottom part $\mathbf{12}_1$ of the forming device is loaded onto the transport subsystem, particularly on the belt 21 of a corresponding conveyor device $\mathbf{20}_1$, with the respective projections 12*a* facing upwards, is indicated with A. The bottom part $\mathbf{12}_1$ may be arranged on the belt 21 in an automated manner, for example by means of a manipulating device, according to a per se known technique, for example after being subjected to a corresponding cleaning and/or drying cycle, for example using air or another gas.

Therefore, the part $\mathbf{12}_1$ advances to the station indicated with B, on the corresponding conveyor 202, in which an automated device 30 positions the main part 11 of the forming device on the corresponding bottom part $\mathbf{12}_1$, with the projections 12*a* of the latter being inserted into the lower end of the holes 11*a*' of the part 11. In this step, the two parts 11 and $\mathbf{12}_1$ are also mechanically coupled to each other, for example using the members 15*a* of FIG. 3 which are snap-engaged onto the part 11. The device 30 may be for example a manipulator susceptible to vertically translate the part 11. The positioning can be managed by a controller which supervises the operation of the processing line, or of the station B, based on the detections carried out using sensor systems or detectors of per se known design. Also in this case, the part 11 may be arranged on the belt 21 after being subjected to a cleaning and/or drying cycle. Obviously, the functions described with reference to stations A and B could be carried out in a single station, or the previously coupled parts 11 and $\mathbf{12}_1$ could be loaded—even manually—directly onto the subsequent station indicated with C.

Therefore, the parts 11 and $\mathbf{12}_1$ assembled together proceed to the station indicated with C, on the corresponding conveyor $\mathbf{20}_3$, which is configured to supply the precursor in dosed amounts in the corresponding forming cavities, i.e., from the upper end of the holes 11*a*' of part 11. The station C may include, for example, a tank 40 which is directly supplied with the precursor previously obtained in powder or granular form. The station or subsystem C may possibly include, upstream of the tank 40, a suitable grinding system, schematically indicated at 40*a*.

The precursor may have an initial moisture content comprised between 5% and 20% by weight, preferably comprised between 8% and 12%. To this end, if necessary, a system for the initial moistening of the precursor and a corresponding mixing system may be provided for upstream of the tank 40 (and downstream of the possible grinding system).

In various preferred embodiments, the loading station C is configured to simultaneously supply a plurality of dosed amounts of the precursor into the plurality of forming cavities 11*a*. To this end, in the case exemplified in the figure, a plurality of nozzles or discharge mouths 41 are associated with the tank 40, particularly in a number corresponding to the number of cavities 11*a*, preferably having shape and size such to be able to be inserted at least slightly into the holes 11*a*' from the upper end thereof. To this end, the tank 40 and/or the nozzles 41 are preferably controllably translatable at least in a vertical direction. Preferably, the nozzles 41 include, or have associated upstream thereto, a suitable dosing system, according to known technologies (volumetric measurement, weighing, time) for dosing the amount of precursor to be introduced into each forming cavity 11*a*.

After the step for loading the precursor, the parts 11 and $\mathbf{12}_1$ advance to the subsequent station D, on the corresponding conveyor 204, which is a station configured to temporarily subject the plurality of dosed amounts of the precursor, contained in the respective forming cavities 11*a*, to an active compression. The pressing station D may comprise a single pressing device 50, for example pneumatically actuated, susceptible to vertically translate a plurality of pressing elements 51, particularly in a number corresponding to the number of cavities 11*a*. The pressing elements 51 preferably have shape and size such to be able to be inserted with minimum clearance into the holes 11*a*' of the part 11, in order to precisely press the dosed amount of precursor contained therein.

At the end of the active compression step, the parts 11 and $\mathbf{12}_1$ advance to the subsequent station E, on the corresponding conveyor 205, in which an automated device 60 (for example similar to the device 30 of the station B) positions the head portion $\mathbf{12}_2$ of the forming device on the main portion 11, with the projections 12*a* of the former being inserted into the upper ends of the holes 11*a*' of the latter. In this step, the part $12_2$ is mechanically coupled to the part 11, for example using the members 15*b* of FIG. 3 which are snap-engaged on the part 11, to complete the forming device 10. Following the positioning of the part $12_2$ on the part 11, the forming cavities 11*a* are now closed. Also in this case, the positioning may be managed by a controller of the processing line, or of the station E, based on the detections carried out using sensor systems of detectors of a known design.

As previously mentioned, the sum of the heights of the projections 12*a* of the parts $12_1$ and $12_2$ is smaller than the height of the holes 11*a*' of the part 11 so that, in the assembled condition of the device 10, a volume suitable to contain the respective dosed amount of precursor is defined in the cavity 11*a*. In various embodiments, such volume is in any case greater, height-wise, than the overall dimensions of the pressed dose contained in the corresponding cavity 11*a*. In other words, following the pressing of step/station D, the height of the pressed dose of precursor may be smaller than the height of the corresponding forming cavity, understood as the distance between the end surfaces of the projections 12*a* of the parts $12_1$ and $12_2$. In this manner, an even minimum free space (indicatively not greater than 1 mm) above each dose, may be present in the cavity, so as to allow a slight expansion of the volume during the subsequent heating. In other embodiments, furthermore, the height of the projections 12*a* of the parts $12_1$ and $12_2$ may be chosen so that, in the assembled condition of the device 10, the containment volumes substantially correspond to those of the dosed amounts, or said projections 12*a* maintain the dosed amounts in an at least slight compression condition.

Then, the forming device 10 advances to the subsequent station F, on the corresponding conveyor 206, which is configured to provide partial or localised moistening of the plurality of dosed amounts of the precursor, contained in the corresponding cavities 11*a*. The moistening station includes a fluidic system 70, designed to supply the moistening fluid into the cavities 11*a*, exploiting the hydraulic system integrated in the forming device 10, in particular the circuits 13 of FIGS. 3 and/or 4. To this end, in various embodiments, the fluidic system 70 comprises one or more movable hydraulic ducts or couplings 71, each designed for the automated coupling and release with respect to a respective inlet 13*a* of the aforementioned hydraulic system of the device 10.

The system 70 and the hydraulic circuits are designed to allow a substantially predetermined amount of the moistening fluid to flow into the forming cavities through the passages 12*b* and 11*b* (FIGS. 3-4). Such supply of fluid, for example pure water, preferably occurs mechanically, i.e., using pumps or similar devices suitable for pushing the liquid into the cavities. Additionally or alternatively, the possibility of superficially moistening the dosed amounts of precursor in a substantially passive way, for example by exploiting capillarity or imbibition phenomena, is not ruled out from the scope of the invention. The injected moistening fluid could be water vapour, rather than water. According to other embodiments not shown, moistening may be achieved by condensing steam on cold walls (for example steam on the cold precursor dose or steam on a cold wall, on which the tablet precursor dose is placed to transfer moisture.

The amount of fluid added is in any case reduced, given that—as explained above—it is not strictly necessary to moisten the dosed amount of precursor uniformly. As mentioned, the amount of fluid supplied is preferably such to moisten only one surface layer of each dosed amount of the precursor, preferably at the end and peripheral surfaces thereof, or possibly even at only one of such surfaces. Obviously, a part of the fluid will tend to spread also toward the centre of the dose, but this diffusion has to be considered as negligible, also considering that the time between the localised moistening step and the subsequent heating step is relatively short (approximately less than 50 seconds).

In various embodiments, at least one of the steps preceding the heating step is carried out in an atmosphere with a low oxygen content or modified with an inert gas (such as for example nitrogen or argon); this for example may occur for the loading step (station C), the possible pressing step (station D), the step for closing the forming cavities (station E) and the moistening step (station F).

After the moistening step, the forming device 10 then passes to the heating station G, on the corresponding conveyor $\mathbf{20}_7$. Such station comprises a microwave oven, indicated with 80, comprising a multimode cavity 81 in which the device 10 is kept for a treatment time sufficient to obtain the tablets 1. As previously mentioned, in preferred embodiments, the microwave oven 80 is a tunnel-like oven, with the respective multimode cavity 81 extending length-wise between an entry IN and an exit OUT, through which the forming device 10 passes through in the direction of advancement X. Preferably, the length dimension of the cavity 81 is such that, when passing through between the entry IN and the exit OUT, the device 10 is temporarily fully contained in the cavity.

In various preferential embodiments, the oven 80 is equipped with a plurality of means 82 for generating the microwaves, for example, with suitable systems 83—known per se—for conveying the microwaves into the multimode cavity 81 associated thereto. Preferably, there are provided for a plurality of microwave sources 82, of any type suitable for the application (for example known magnetrons), with waveguides 83 associated thereto, configured for the introduction of microwave beams MW into the multimode cavity 81 from a plurality of areas of the latter. Possibly, suitable mirrors or similar elements 85 may also be provided for in the multimode cavity to guide the reflection of the microwaves MW in desired directions, all according to a per se known technique. A substantial advantage of multimode microwave treatment lies in the possibility of simultaneously heating a large number of precursor doses.

FIG. 5 schematically illustrates the case of an oven 80 provided with two microwave generators 82 and corresponding guides 83, arranged to obtain an irradiation from above and from below in the multimode cavity 81: obviously, this must be understood by way of example only, given that in the practical implementation of the invention the multimode cavity and the microwave generation and distribution system may provide for a different number of generators e and a different arrangement of the irradiation/reflection points. The waveguides 83 could also be replaced by suitable antennas connected to a corresponding generator by means of a coaxial cable.

Generally speaking, the multimode cavity 81 and the system 82, 83, 85 for generating and distributing the microwaves MW is optimised, according to known techniques, as a function of the dimensions of the load represented by the precursor doses contained in the forming device 10: with this regard, it should be noted that the use of microwave ovens with multimode cavities, also tunnel-shaped, is now widely used in various fields, including the food production industry.

Therefore, it should be emphasised that the distribution of the microwaves MW in the multimode cavity 81, as shown for the station G of FIG. 5, is provided solely for schematic representation purposes. FIG. 7 illustrates, still schematically, a cross-section of a possible multimode cavity 81 which can be used for the implementation of the invention: in the example, the hexagonal section of the cavity 81 is exploited to reflect on the forming device 10, and therefore on the precursor doses contained therein, the microwave beams MW coming from four waveguides 83, in order to obtain an even heating of the doses (as previously mentioned, the conveyor belt 21 is preferably made of material transparent to microwaves, same case applying to the material forming the parts of the device 10 which define the forming cavities 11*a*).

As previously mentioned, the cavities 11*a* defined between the parts 11-12 of the forming device are not hermetically sealed, thereby allowing venting of the steam which can be generated during microwave heating of the locally moistened precursor doses. Obviously, the parts 11-12 in question could also be designed so as to define suitable steam venting passages.

The multimode cavity 81 may be provided with a steam extraction system, for example including one or more extraction fans.

The simultaneous continuous production of the tablets, and in particular the treatment thereof in the oven 80, is simplified due to the fact that the step for the active compression of the precursor doses (carried out at the station D) is separated from the step of irradiating with microwaves (carried out at the station G).

As said, the methods for manufacturing the oven and the cavity thereof depend on the load to be heated and the optimisation thereof can be obtained using per se known techniques, particularly obtained from similar applications in the food industry. This applies in particular to the resonance frequency of the cavity 81, the frequency of the signal output from the sources 82 and the characteristics of the corresponding systems 83, 85 for the conveying and possible reflection of the microwaves (as known, for example, the sizing of the waveguides determines the mode propagation and distribution phenomena). Generally, the sources 82 will preferably be configured to generate an alternating electromagnetic field with an emission frequency oscillating up to 3 GHZ, preferably comprised between 2.40 and 2.50 GHz, most preferably close to 2.45 GHz, or lower than 1 GHz, preferably comprised between 865 and 965 MHz, most preferably close to 915 MHz.

The overall power of the oven 80 depends on the number of sources used, which in turn depends on the size of the load (i.e., on the number of doses heated simultaneously). Generally, the oven 80 may be equipped with a number of sources 82 (for example magnetrons) greater than two, particularly comprised between two and six, each having a power comprised between 1 and 3 kilowatts, with each source 82 preferably supplying a respective waveguide 83. Still preferably, the waveguide system is configured so that the microwaves conducted in the multimode cavity 81 irradiate the forming device 10 both from above and from below, and possibly also laterally.

The moisture content significantly affects the dielectric properties of the load, and therefore the heating thereof. In the case of the present invention, following heating with microwaves, the moistened surface layer of the precursor doses is compacted following heating, obtaining the tablets, or the shell 5 thereof.

As observed above, according to a preferred characteristic of the invention, the moistening step is carried out individually for each precursor dose, and carried out so as to determine a moisture gradient in the dose, with greater or concentrated moistening at at least one peripheral area of the dose. This selective moistening allows to obtain a better coupling of the particles of the precursor in such area, particularly for obtaining the layer or shell 5 of the tablet, which will therefore have a more robust and resistant outer surface, such to also reduce the dusting phenomena.

The consistency of the tablet, or of the layer 5 thereof, is mainly achieved due to caking phenomena that occur during heating in the microwave oven. Caking is the tendency of a powder or granular material to form lumps, due to increased interparticle forces. The cohesion between particles without the formation of solid bridges can be attributed to Van der Waals forces, which define the attraction forces between molecules. Even if a molecule is not polar, electron displacement causes it to become polar for a very short time. The negative end of the molecule causes the surrounding molecules to have an instantaneous dipole, in turn attracting the positive ends of the surrounding molecules (this process is essentially due to London forces, also referred to as instantaneous dipole-induced dipole interactions).

As a result, it can be assumed that the caking of the precursor, particularly coffee, which occurs during heating with microwaves is mainly due to Van der Waals forces and polar interactions. All these forces increase as the distance between the particles decreases, and for this reason the active compression step (station/step D) carried out before the microwave treatment may be useful.

In addition to that, stickiness phenomena may possibly be present. For example, coffee does not contain low molecular weight sugars, which typically induce stickiness and caking. However, coffee contains polymeric substances (proteins, starches, pectins) which are assumed to have a similar behaviour: the presence of the moisture supplied to the coffee powder allows to reduce the transition temperature of such substances, acting as a plasticiser, and thereby enhancing caking of the precursor to form the shell 5, during the step for heating with microwaves.

During the heating step each dose of the precursor tends to expand, but such expansion is limited in the confined volume of the cavity 11*a* (as mentioned above, the useful volume of the cavity 11*a* may be slightly greater than the volume of the dose previously compressed at station/step D): this slight increase in controlled volume advantageously contributes to reducing the stresses in the structure of the tablet being formed, reducing the risks of breaking the matrix thereof.

The treatment time in the oven 80 is very low in relation to the number of tablets treated, and this obviously depends on the load and the power of the oven. By way of example, the treatment time (or transit time, in the example shown) of a forming device 10 of the type exemplified in a multimode cavity 81 designed for the treatment of 40 precursor doses at a time may be less than 50 seconds, particularly comprised between 12 and 18 seconds depending on the power applied.

Moving on to FIG. 6, after heating, the forming device 10 passes to station H, on the corresponding conveyor $\mathbf{20}_8$. This station is equipped with a manipulating device 60' substantially designed similar to the device 60 of the station E, but suitable for the reverse operation, that is for lifting or in any case for removing the head part $\mathbf{12}_2$ of the forming device 10. To this end, the manipulating device 60' has—associated therewith—a release system 61, configured (i.e., comprising means) to release the members 15*b*, so as to allow the separation of the head part $\mathbf{12}_2$ from the main part 11. After removal, the part $\mathbf{12}_2$ may be subjected to a step for the automated cleaning and/or drying (for example with air), particularly of the projections 12*a* thereof, and/or to a step for bleeding the hydraulic circuit 13 thereof.

The remaining parts 11 and $\mathbf{12}_1$ of the forming device then move to station I, on the corresponding conveyor 209. Also such station is equipped with a handling device 30' designed similar to the device 30 of station B, but suitable for the reverse operation, that is for lifting or removing the main part 11 of the forming device with respect to the base part $\mathbf{12}_1$. To this end, also the manipulating device 30' has—associated therewith—a corresponding release system 31, configured (i.e., comprising means) to release the members 15*a*, so as to allow separation of the part 11 from the part $\mathbf{12}_1$. Also in this case, after removal, the part 11 may be subjected to a step for the automated cleaning and/or drying, particularly of the through holes 11*a'* thereof, and/or a step for bleeding the hydraulic circuit 13 thereof.

In various preferred embodiments, the station I may include a first separation arrangement 32, for example associated with the device 30', configured to obtain the exit of the tablets 1—now formed—from the holes 11*a'* of the part 11. This separation arrangement 32 may include, for example, a system designed to introduce respective air flows into the holes 11*a'* from above, with a pressure sufficient to obtain the sliding of the tablets 1 into the holes 11*a'*, until they exit from the corresponding lower ends and rest on the projections 12*a* of the base part $\mathbf{12}_1$. The step of blowing air (or another suitable gas) into the holes 11*a* can be conveniently synchronised with the step of lifting the part 11. The use of air flows can be advantageous also for the purposes of determining a first temperature drop of the tablets 1 following the treatment with microwaves. Instead of a pneumatic system, the separation arrangement 32 could be provided with mechanical pushers, for example pneumatically driven, each at a corresponding hole 11*a'*.

The base part $\mathbf{12}_1$ carrying the tablets 1 then moves to the station J, on the corresponding conveyor $\mathbf{20}_{10}$, configured to remove the tablets 1 from such part $\mathbf{12}_1$. The separation station J may be made according to any known technique, particularly in the food industry. For example, the station J may include a pick-up and displacement device 90, having a vertically translatable part with which there are associated a plurality of gripping members 91—for example pneumatically driven suction cups—whose number corresponds to the tablets 1 and suitable to lift the latter from the base part $\mathbf{12}_1$. In preferred embodiments, the pick-up members 91 consist of known suction cups based on Bernoulli's principle, suitable for the contactless handling of sensitive objects.

The device 90, or at least the part thereof carrying the gripping members 91, may also be translatable horizontally, in order to transfer the tablets 1 onto the conveyor 2011 of the subsequent station K, configured for the post-processing of the tablets, for example for a desiccation and/or drying and/or cooling thereof. In various embodiments, this post-treatment is carried out in an atmosphere with a low oxygen content or modified with an inert gas (such as nitrogen or argon for example).

It should be noted that, when exiting from the oven 80, the tablets 1 have a relatively high surface temperature (for example comprised between 50° C. and 85° C.), whose dissipation takes several minutes. With this regard, it should also be noted that most of the moisture present in the precursor dose is not removed during the treatment step in the oven 80, but at a later time: in particular, it was observed that—in the absence of a desiccation or a drying or a mechanical cooling—the loss of most moisture (measured in weight loss) occurs within 5-10 minutes after the treatment with microwaves. The chart of FIG. 8 clarifies this aspect, with reference to a tablet treated in the oven 80 so as to heat the outer shell 5 thereof to about 75° C. As observable, for a tablet having a mass of 8.3 g exiting from the oven 80, the substantial weight stabilisation (about 8.15 g) is obtained after about seven minutes, with a faster weight drop in the first three minutes. This weight drop (i.e., the moisture content drop) is caused by the still relatively high temperature of the tablets.

Given that it is preferable to reduce the exposure of the tablets to air after their production (in order to avoid triggering of oxidation phenomena), and therefore to reduce the time between the exit from the oven 80 and the packaging of the tablets, it is preferable to provide the station K, which may include, for example, a desiccating or cooling tunnel 100 of the per se known type for use in the food industry.

The final moisture content, i.e., at the end of the tablet production process, before the packaging thereof, is preferably less than 5% by weight.

Downstream of station K the tablets—substantially at ambient temperature—reach a station 110, where they are packaged—in an automated manner—in groups in corresponding protection containers, for example bags made of material having good oxygen barrier properties. The packaging technology adopted may be of any known type, for example of the vacuum type or of the MAP (Modified Atmosphere Packaging) type, or of the protected atmosphere type, wherein—in the containers of the tablets—air is replaced with an inert gas (for example nitrogen or argon), suitable for increasing the preservation period.

As previously mentioned, according to a preferred characteristic of the invention, the dosed amounts of the precursor are subjected to a partial or localised moistening step, that is for a peripheral layer thereof.

The moisture content (or water content) of the precursor significantly affects the effect of microwaves, for example in the case of use of microwave or radio frequency, given that:

- water is a lossy dielectric, having the property of absorbing electromagnetic waves and converting them into heat;
- the higher the moisture content of the dose, the higher the dielectric constant;
- the higher the dielectric constant, the greater the heating effect.

Based on the above, increasing the moisture content of each dosed amount therefore allows to increase the ability of the electromagnetic waves to impart energy to the corresponding precursor, and the heating time at the full power of the oven 80 can be reduced due to this increased ability.

Practical tests carried out by the Applicant allowed to verify that the described process can be obtained for example by supplying to dosed amounts of coffee a moisture content comprised between 7% and 14% by weight (to obtain tablets measuring about 40 mm in diameter, about 12 mm in thickness and weighing about 8.3 g at exit from the oven), with a microwave irradiation such to bring the final surface of the tablets to a temperature comprised between 70° C. and 75° C.

As explained, most of the water content is preferably located at a peripheral layer of the dose, at which the energy supply obtained through the microwaves will be maximum, thus giving rise to the formation of the outer crust or shell 5 of the tablet of FIG. 2.

The supply of heat to the central part of the dose (that is, the part intended to form the core 6 of FIG. 2) will instead be limited, and dependent on the moisture content thereof. When supplied to the cavities 11*a*, the precursor has a homogeneous initial moisture content, which may be varied depending on the type of consistency desired for the core 6 of the tablet. For example, in the absence of any prior moistening, it can be assumed that the initial moisture content of the dose amounts to 2-2.5% by weight on the total of the dose, on average. Such an initial moisture content allows to obtain a very limited heating of the central part of the dose in the corresponding forming cavity, such not to cause substantially any caking thereof (in other words, the core of the relative tablet will substantially remain in powder form). On the other hand, subjecting the precursor to a prior homogeneous moistening (for example upstream of the tank 40 of the station C of FIG. 5) up to a moisture content of about 4.5% by weight on the total of the dose loaded into the relative forming cavity will allow to obtain a higher heating of the central part of the dose, with a partial caking thereof, which will however be markedly lower than the caking obtained at the layer 5, significantly more moistened (due to the specific step carried out at the station F of FIG. 5). In the case of a similar prior homogeneous moistening of the precursor up to a moisture content of about 8% by weight of the total dose loaded into the corresponding forming cavity, it will be possible to obtain an even higher heating of the central part of the dose, with a more marked caking thereof, which will in any case be still much lower than the caking obtained at the layer 5, due to the same reasons explained above.

As mentioned, the formation of the shell or crust 5 allows to obtain a sort of container for the less compact core 6. This more compact outer part of the tablet 1 allows to limit dusting phenomena. On the other hand, the low heat supply to the central part 6 of the tablet 1 allows to reduce the risks of changing the organoleptic properties of the precursor (and therefore the risks of bad flavours), as well as to speed up the subsequent desiccating or drying or cooling step. For the same reason, given that heating can be concentrated predominantly on the peripheral layer of the dose alone, the overall energy of the heating process can also be reduced, compared to the case of the uniform heating of the entire dose.

As mentioned, in variant embodiments, a crust 5 could however be obtained even only at one of the surfaces 2, 3 and 4 of the tablet 1, in order to make such surface more robust, for example only the upper surface 2 thereof, for the purpose of engraving possible distinctive signs. In these cases, the precursor must obviously be initially moistened homogeneously and sufficiently to ensure that—following the subsequent treatment with microwaves—also the remaining part of the tablet meets the required robustness and self-supporting characteristics.

The description outlined above clearly shows the characteristics and advantages of the present invention. The proposed solution allows to easily and rapidly produce high amounts of tablets for the extraction of beverages, starting from a precursor in powder or granular form, particularly coffee. The systems and methods described allow significant increases in productivity with respect to the prior art and they are efficient in terms of energy consumption. It is clear that the numerous variants are possible for the person skilled in the art, without departing from the scope of the invention as defined by the claims that follow.

The system described with reference to FIGS. 5-6, configured as a continuous production line, may obviously have configurations different from those exemplified, without prejudice to the basic functions thereof. For example, it should be observed that various steps described above in relation to different operating stations could be carried out on one and the same station, particularly when the automated devices that carry out these steps are mounted in a movable manner. In this perspective, for example, the steps described for the stations C, D and E could be carried out in the same station, i.e., on the same conveyor 20, using the devices 40, 50 and 60, respectively, which can be moved and superimposed in succession to the parts $\mathbf{12}_1$ and 11 of the forming device. The same applies, for example, to the steps described for stations I, J and K, in relation to the devices 30'-31 and 90. For example, the functions of station J could be integrated in station I, to deposit the tablets 1 directly on the conveyor serving station K.

The microwave oven, instead of being configured like a tunnel, could have a multimode cavity with an opening which acts as an entry and as an exit for the introduction and removal of the forming device. In such case, the oven may for example be arranged to the side of the transport subsystem and include a manipulation or transfer arrangement configured to introduce the forming device 10 into the multimode cavity and then remove it therefrom, through the aforementioned opening. Such an arrangement could be configured to transfer the forming device from a conveyor, in order to introduce it into the multimode cavity, to remove it therefrom, and then to transfer it to the conveyor once again, or configured (i.e., comprising means) to transfer the forming device from a first conveyor (for example, belonging to the station upstream of the oven), to introduce it into the multimode cavity, to remove it from such cavity, and then to transfer it onto a second conveyor (for example belonging to the station downstream of the oven). The manipulation or transfer arrangement could advantageously have a movable support for the forming device which includes a vertical wall (for example in the form of a drawer), susceptible to close the single opening of the multimode cavity when the forming device is inside said cavity.

As mentioned above, the same conveyor 20 could serve several successive stations. The described system or line could obviously also include further subsystems or processing stations, if deemed necessary.

The invention claimed is:

1. A method for producing tablets for extraction of a liquid food product, wherein each tablet is formed starting from at least one ingredient in granular or powder form, and wherein, in order to form each tablet, a dosed and moistened amount of the ingredient is irradiated with microwaves while contained in a confined volume, the method comprising the steps of:

a) providing the ingredient in powder or granular form;

b) loading at least one dosed amount of the ingredient into a respective forming cavity;

c) irradiating the at least one dosed and moistened amount of the ingredient by means of microwaves while contained in the respective forming cavity;

wherein step b) comprises loading a plurality of dosed amounts of the ingredient into respective forming cavities of a multi-cavity forming device;

where step c) comprises introducing the multi-cavity forming device into a multimode cavity of a microwave oven, the multimode cavity being configured such that an irradiation of the microwaves within the multimode cavity causes heating of all dosed amounts of the ingredient in the respective forming cavities of the multi-cavity forming device, to simultaneously form a plurality of tablets each having a self-supporting structure, after step c) the multi-cavity forming device being removed from the multimode cavity of the microwave oven.

2. The method according to claim 1, wherein, before step c) a step of selective moistening of each dosed amount of the ingredient is provided for, only at a surface layer thereof.

3. The method according to claim 2, wherein the step of selective moistening is performed after each dosed amount of the ingredient has been loaded into the respective forming cavity.

4. The method according to claim 1, wherein step c) comprises irradiating the microwaves in the multimode cavity from a plurality of microwave sources.

5. The method according to claim 1, wherein step c) comprises causing reflection of at least part of the microwaves in the multimode cavity towards the multi-cavity forming device, the reflection being obtained at least in part by means of reflection guide elements.

6. The method according to claim 1, wherein, during step c), the dosed amounts of the ingredient are contained in the respective forming cavities in absence of an active compression.

7. The method according to claim 1, comprising temporarily subjecting the dosed amounts of the ingredient contained in the respective forming cavities to an active compression, the active compression being interrupted before step c).

8. The method according to claim 1, wherein, during step c), the multi-cavity forming device is displaced in a direction of advancement between an entry and an exit of the multimodal cavity, the microwave oven being a tunnel microwave oven.

9. A tablet for extraction of a liquid food product having a body formed from at least one substantially insoluble ingredient in granular or powder form, the body of the tablet having a self-supporting structure including an outer shell and an inner core both formed by the at least one ingredient and having a different degree of compactness, the outer shell having a more compact and rigid structure, and the inner core having a less compact structure.

10. The tablet according to claim 9, wherein the inner core has a substantially granular or powder structure.

11. A system for producing tablets for extraction of a liquid food product starting from at least one ingredient in granular or powder form, the system being designed for irradiating with microwaves a dosed and moistened amount of the ingredient which is contained in a confined volume, the system comprising at least:

a forming sub-system, configured to confer the tablets a predefined shape;

a loading sub-system, configured to supply the at least one ingredient, in a dosed amount, into a respective forming cavity of the forming sub-system;

a moistening sub-system, configured to moisten at least part of the at least one ingredient;

a heating sub-system, configured to irradiate with microwaves the at least one ingredient while contained in the respective forming cavity of the forming sub-system;

a transport sub-system;

wherein the forming sub-system includes a multi-cavity forming device, the transport sub-system being configured to cause displacements of the multi-cavity forming device, wherein the multi-cavity forming device comprises a body in which a plurality of forming cavities is defined, wherein the loading sub-system is configured to load a plurality of dosed amounts of the at least one ingredient into respective forming cavities of the body of the multi-cavity forming device;

wherein the heating sub-system comprises a microwave oven, having a multimode cavity configured to receive therein the body of the multi-cavity forming device;

wherein the transport sub-system is configured to introduce into, and remove from, the multimode cavity the body of the multi-cavity forming device, such that the plurality of forming cavities defined in said body are simultaneously located within the multimode cavity;

and wherein the multimode cavity is configured such that microwave irradiation within the multimode cavity causes all dosed amounts of the at least one ingredient contained in the respective forming cavities of the body of the multi-cavity forming device to be heated simultaneously.

12. The system according to claim 11, wherein the moistening sub-system and the forming sub-system are configured to obtain moistening of the at least one ingredient within the respective forming cavity of the body of the multi-cavity forming device.

13. The system according to claim 12, wherein the moistening sub-system and the forming sub-system are configured to obtain moistening of only a surface layer of each dosed amount.

14. The system according to claim 11, wherein the microwave oven includes a plurality of microwave sources and/or waveguides configured for supplying microwave beams into the multimode cavity from a plurality of zones thereof.

15. The system according to claim 11, wherein the multimode cavity is provided with reflection guide elements, for reflection of at least part of the microwaves towards the multi-cavity forming device.

16. The system according to claim 11, wherein the body of the multi-cavity forming device comprises a first body part, in which at least part of the forming cavities are defined, and at least one second body part which is couplable in a releasable way to the first body part for closing the forming cavities at at least one axial end thereof, where the at least one second body part comprises a bottom part and a head part between which the first body part is set.

17. The system according to claim 11, wherein the body of the multi-cavity forming device has at least one fluidic circuit for conveying a moistening fluid into each forming cavity.

18. The system according to claim 17, wherein each forming cavity has moistening passages in fluid communication with the fluidic circuit, the moistening passages being at a surface delimiting a respective forming cavity.

19. The system according to claim 17, wherein the moistening sub-system comprises one or more connecting ducts which are couplable in a releasable way to respective inlets of the at least one fluidic circuit of the multi-cavity forming device.

20. The system according to claim 11, also comprising at least one of the following:

a first handling sub-system upstream of the microwave oven, configured to couple together a first body part and at least one second body part of the body of the multi-cavity forming device; and a second handling sub-system downstream of the microwave oven, configured to decouple a first body part and at least one second body part of the body of the multi-cavity forming device.

21. The system according to claim 11, wherein the loading sub-system is configured to supply simultaneously the plurality of dosed amounts of the at least one ingredient into the plurality of forming cavities of the body of the multi-cavity forming device.

22. The system according to claim 11, further comprising at least one pressing sub-system upstream of the microwave oven, configured to:

temporarily subject the plurality of dosed amounts of the at least one ingredient contained in the respective forming cavities of the body of the multi-cavity forming device to an active compression, and interrupt said active compression before introduction of the body of the multi-cavity forming device into the multimode cavity of the microwave oven.

23. The system according to claim 11, further comprising at least one separation sub-system, downstream of the microwave oven, configured to remove the tablets from the body of the multi-cavity forming device.

24. The system according to claim 11, further comprising at least one from among a drying sub-system, a desiccation sub-system, a cooling sub-system for the tablets, downstream of the microwave oven and upstream of a packaging sub-system.

25. The system according to claim 11, wherein the transport sub-system comprises at least one conveyor belt, made at least in part with a microwave-transparent material.

26. The system according to claim 11, wherein the transport sub-system comprises a plurality of conveyor belts arranged in sequence.

27. The system according to claim 11, wherein the transport sub-system is configured to cause a displacement of at least one body part of the body of the multi-cavity forming device in a direction of advancement, between a succession of operating stations selected from among:

one or more first handling stations for handling body parts of the multi-cavity forming device, upstream of the microwave oven;

a loading station, for loading the plurality of dosed amounts of the at least one ingredient, upstream of the microwave oven;

a pressing station, for pressing the plurality of dosed amounts of the at least one ingredient, upstream of the microwave oven;

a moistening station, for partial moistening of the plurality of dosed amounts of the at least one ingredient, upstream of the microwave oven;

a heating station which comprises the microwave oven, the multimode cavity being substantially configured as a tunnel with one entry and one exit, one or more second handling stations for handling body parts of the multi-cavity forming device, downstream of the microwave oven;

a separation station, for removing the tablets from at least one body part of the multi-cavity forming device, downstream of the microwave oven;

at least one from among a drying station, a desiccation station and a cooling station for the tablets, downstream of the microwave oven;

a packaging station for packaging the tablets.

28. The system according to claim 27, wherein the transport sub-system is configured to cause displacement of the body of the multi-cavity forming device in the direction of advancement through the entry and the exit of the multimode cavity of the microwave oven.

* * * * *